United States Patent

Miyazaki et al.

[11] Patent Number: 5,614,594
[45] Date of Patent: Mar. 25, 1997

[54] CURABLE RESIN COMPOSITION FOR OVERCOAT FILM OF COLOR FILTER AND COLOR FILTER

[75] Inventors: Susumu Miyazaki, Kitasoma-gun; Shigeaki Chika, Ehime; Kouichi Satou, Ibaraki; Naoki Takeyama; Shigeki Yamamoto, both of Osaka, all of Japan

[73] Assignee: Sumitomo Chemical Company, Limited, Osaka, Japan

[21] Appl. No.: 453,649

[22] Filed: May 30, 1995

[30] Foreign Application Priority Data

Jun. 1, 1994 [JP] Japan .................................. 6-120232

[51] Int. Cl.$^6$ .................................................. C08G 20/32
[52] U.S. Cl. .................................. 525/327.3; 349/104
[58] Field of Search ........................... 525/327.3; 359/66

[56] References Cited

U.S. PATENT DOCUMENTS

| | | | |
|---|---|---|---|
| 3,859,255 | 1/1975 | Heer et al. | 525/533 |
| 4,300,614 | 11/1981 | Kageyama et al. | 428/413 |
| 4,390,664 | 6/1983 | Kanayama et al. | 528/98 |
| 5,364,910 | 11/1994 | Takanishi et al. | 525/327.3 |

FOREIGN PATENT DOCUMENTS

| | | |
|---|---|---|
| 4-164918 | 6/1992 | Japan . |
| 5-216231 | 8/1993 | Japan . |
| 6-75108 | 3/1994 | Japan . |

OTHER PUBLICATIONS

Derwent acc. No. 93–306050/39 for Japanese Patent No. 5–216231, Aug. 1993, Sumitomo Chem. Co. Ltd.

*Primary Examiner*—Robert E. Sellers
*Attorney, Agent, or Firm*—Birch, Stewart, Kolasch & Birch, LLP

[57] ABSTRACT

A curable resin composition used as an overcoat film of a color filter for a color liquid crystal display device contains polyglycidyl methacrylate and a curing agent comprising a carboxylic anhydride and a bisphenol S, a halogen- or (halo)alkyl-substituted derivative thereof, or a diaminophenol. The cured composition is used as an overcoat film with good heat resistance on a color filter of a liquid crystal display device.

10 Claims, 2 Drawing Sheets

CURABLE RESIN COMPOSITION FOR OVERCOAT FILM OF COLOR FILTER AND COLOR FILTER

BACKGROUND OF THE INVENTION

1. Field of the Invention

The present invention relates to a curable resin composition and a color filter. In particular, the present invention relates to a curable resin composition to be used as a protective film of a color filter, called an overcoat (OC) film, which is an essential element for coloring a liquid crystal display device, and a color filter comprising such an overcoat.

2. Description of the Related Art

Hitherto, a liquid crystal display device (LCD) has been used in portable television sets. Over the years, the number of color LCDs having a large size and a large face plane used for office automation equipment and information-related equipment have rapidly increased. An LCD having an image quality which is substantially comparable with a cathode ray tube (CRT) has been commercially available as the result of development of a passive-addressing mode element utilizing a twisted nematic (TN)liquid crystal or a super twisted nematic (STN) liquid crystal and an active-addressing mode element represented by a thin film transistor (TFT).

Many investigations have been made for the improvement of the image quality of a color LCD and its production. Key factors included improvement of quality of a color filter which is essential to coloring of the LCD and a stable supply thereof.

The OC film used on the color filter of the color LCD is required to have the following properties:

(1) The OC film fills a step been pixels to achieve surface flatness. Unevenness of the surface is from 0.1 to 0.2 µm for TN and TFT, and is less than 0.05 µm for STN.

(2) The OC film is resistant to conditions in post-processing at high temperatures such as ITO (indium-tin oxide) sputtering or lamination of panels.

(3) The OC film increases solvent resistance of the color filter.

(4) The OC film has good adhesive properties. When the adhesiveness between the color filter and the OC film is insufficient, failure mode is generated in a reliability test of the LCD, so that the LCD cannot be practically used. For use with the STN element, when the adhesiveness is decreased in the etching process for ITO patterning, the layers are delaminated between the ITO film and the OC film or between the OC film and the color filter.

(5) The OC film is transparent in the visible light range.

(6) The coating liquid for the OC film has good storage stability.

Hitherto, as a material of the OC film for the color filter of an LCD, an epoxy, polyimide or acryl base resin composition has been studied.

However, a conventional resin composition cannot satisfy all of the above requirements at a satisfactory level.

For example, when an ITO film is formed on a conventional OC film by sputtering at a high temperature, minute wrinkles form, the film is discolored to impair the transparency, film thickness is decreased, or the ITO film is minutely cracked, so that the intended color filter may not be obtained.

In the case of the color filter of the STN element, since patterning of the ITO film is necessary after the formation of the ITO film, it is subjected to the post-processing such as photolithography, etching, and so on. In the post-processing, because of insufficient adhesiveness of the OC film, the delamination may appear between the ITO film and the OC film or between the OC film and the color filter. Further, in the heat treatment step when the LCD panel is assembled using the color filter, because of insufficient heat resistance, the OC film is discolored, so that the quality of the whole LCD may be seriously deteriorated.

Since the coating liquid for the formation of the OC film has poor storage stability, two components, that is the base component and the curing agent should be mixed just before coating, or it is troublesome to remove the coating liquid from a coater after coating with a spin coater, etc.

SUMMARY OF THE INVENTION

One object of the present invention is to provide a curable resin composition which can provide an OC film to be used on a color filter of a color liquid crystal display device, which film can realize the above properties, in particular, good resistances to heat, sputtering and ITO patterning.

Another object of the present invention is to provide a color filter for a color liquid crystal display device having an improved protective film thereon.

According to a first aspect of the present invention, there is provided a curable resin composition used as an overcoat film of a color filter for a color liquid crystal display device, comprising polyglycidyl methacrylate and a curing agent.

According to a second aspect of the present invention, there is provided a curable resin composition used as an overcoat film of a color filter for a color liquid crystal display device, comprising polyglycidyl methacrylate, a curing system which comprises a carboxylic anhydride and a phenol compound of the formula:

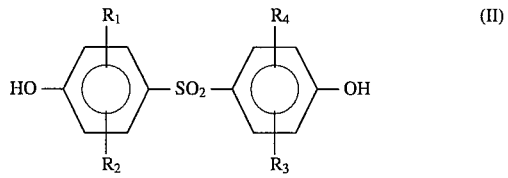

wherein $R_1$ to $R_4$ are independently a hydrogen atom, a halogen atom or an alkyl group which may be substituted with a substituent, and a silane coupling agent having an epoxy compound.

According to a third aspect of the present invention, there is provided a color filter for a color liquid crystal display device, which is overcoated with a cured material of the curable resin composition of the present invention.

DETAILED DESCRIPTION OF THE INVENTION

Figure 1:
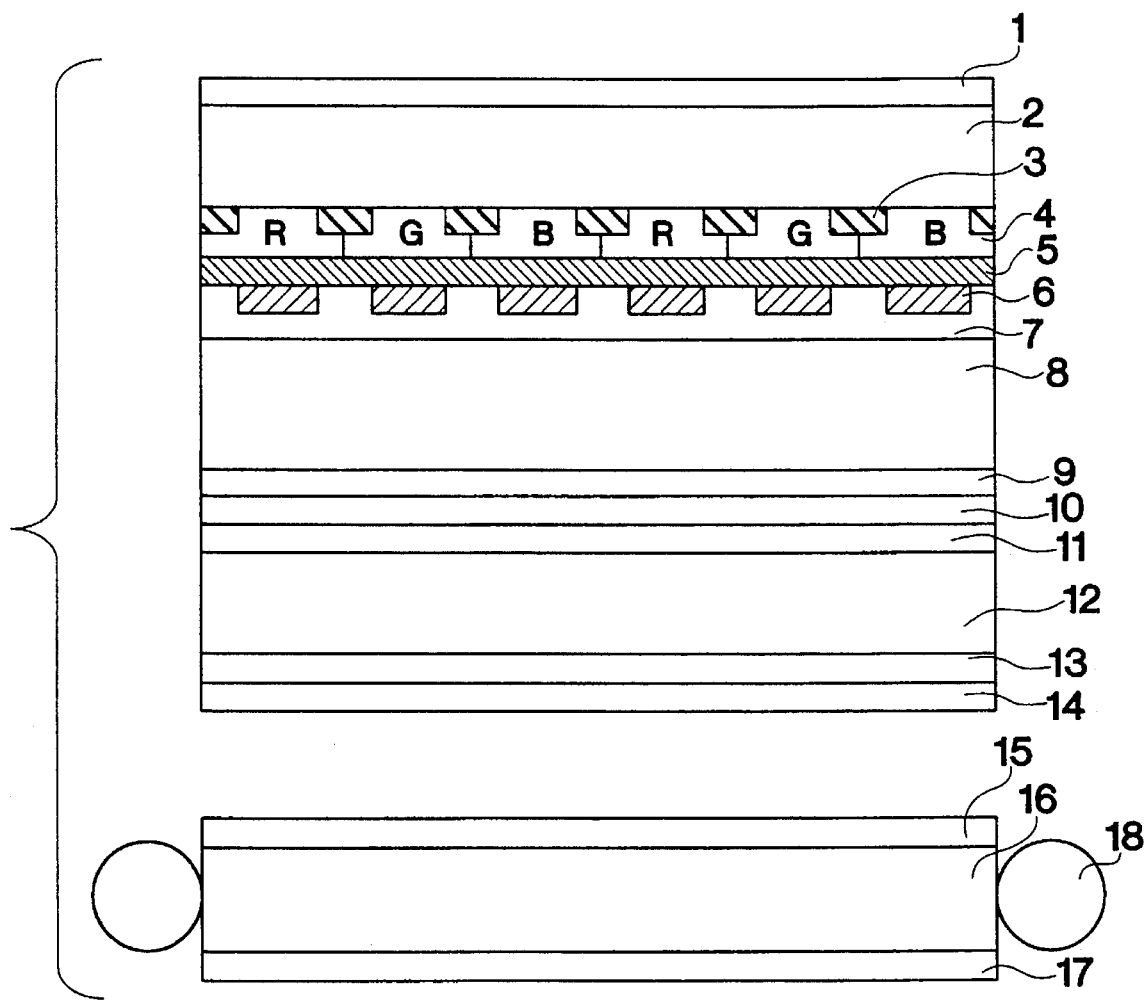
FIG. 1 is a cross sectional view of a basic color liquid crystal display using STN addressing elements.

Examples of the polyglycidyl methacrylate are a homopolymer of glycidyl methacrylate, and a copolymer of glycidyl methacrylate with an ester of methacrylic acid such as an alkyl methacrylate having 1 to 4 carbon atoms in the alkyl group, acrylonitrile, and so on. Preferably, the homo- or copolymer is prepared by a radical polymerization process.

The polyglycidyl methacrylate to be used in the present invention has a weight average molecular weight of 5000 to 1,000,000, preferably 10,000 to 600,000.

In the case of the copolymer, a molar ratio of glycidyl methacrylate to a copolymerizable monomer is from 1:9 to 9:1, preferably from 4:6 to 6:4. These parameters are suitably selected from these ranges according to a coating property, a curing time, and the like.

As an additive to be used in the present invention, a heat-curing agent is preferably used. Specific examples of the curing gent are triphenylphosphine, lower alkylamine (e.g. hexamethylenediamine, triethylenetetramine, etc.), aromatic amines (e.g. diphenylamine, aminophenol, etc.) and their bis-compounds, phenols (e.g. cresols, bisphenol A, etc.) and their bis-compounds, and so on. While a carboxylic anhydride may be used, the amine curing agent is preferred in view of the improvement of water resistance, and the maintenance of adhesive properties in the lithography and etching steps for the ITO patterning in the case of the color filter for the STN element.

In view of the water resistance and the storage stability, the compound of the following formula (I) is preferred:

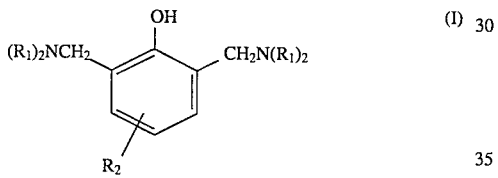

(I)

wherein $R_1$ is a hydrogen atom or a lower alkyl group having, for example, 1 or 2 carbon atoms, and $R_2$ is a hydrogen atom, a lower alkyl group having, for example, 1 to 6 carbon atoms or a group of the formula: —$CH_2N(R_3)_2$ in which $R_3$ is a hydrogen atom or a lower alkyl group having, for example, 1 or 2 carbon atoms.

The curing agent of the formula (I) which is preferably used in the present invention is conventionally used as a curing accelerator of an epoxy resin. The use of the curing agent of the formula (I) is one of the specific characteristics of the present invention.

Among the compounds of the formula (I), the following compounds are preferably used:

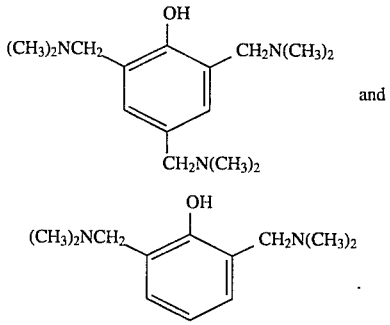

and

In the curable resin composition, an amount of the curing agent is preferably from 0.001 to 10 parts by weight, more preferably from 0.05 to 5 parts by weight per 100 parts of polyglycidyl methacrylate.

Further, as a curing agent, a combination of a carboxylic anhydride and a phenol compound of the formula (II):

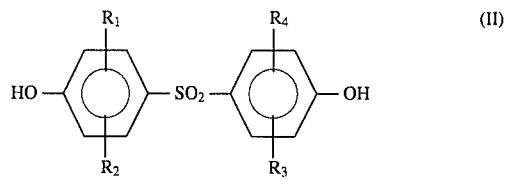

(II)

wherein $R_1$ to $R_4$ are independently a hydrogen atom, a halogen atom or an alkyl group having, for example, 1 to 4 carbon atoms which may be substituted with a substituent such as a halogen atom.

The curable resin composition of the present invention contains this combination as the curing system has remarkable storage stability, so that its viscosity does not substantially increase even after storage at room temperature (23° C.) for one month.

Specific examples of the phenol compound (II) are bisphenol S of the following formula:

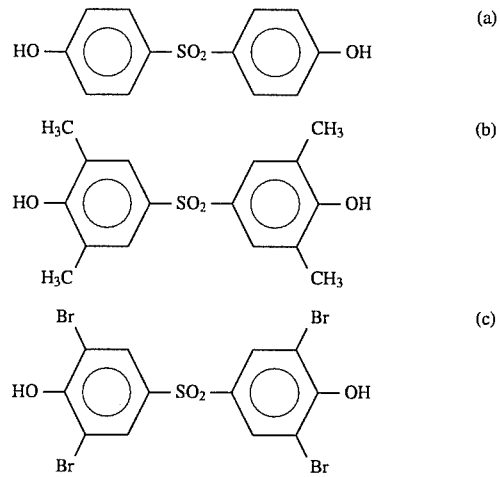

Among them, the compound of the formula (a) is preferred.

Examples of the carboxylic anhydride are trialkyltetrahydrophthalic anhydride (e.g. YH-306 (a trade name) manufactured by Yuka Shell Epoxy, Co., Ltd.), methylcyclohexenedicarboxylic anhydride (e.g. EXB-4400 manufactured by Dainippon Ink Co., Ltd.), phthalic anhydride, trimellitic anhydride, polymellitic anhydride, benzophenonetetracarboxylic anhydride, ethyleneglycol bistrimellitate (e.g. TMEG manufactured by Shin-Nippon Rika Co., Ltd.), glycerol tristrimellitate (e.g. TMTA manufactured by Shin-Nippon Rika Co., Ltd.), chlorendic anhydride (HET anhydride), tetrabromophthalic anhydride, and an acid anhydride of the formula:

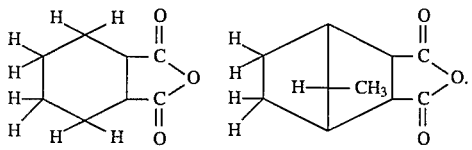

Further, a silane coupling agent having an epoxy group can be used as an additive. Examples of such silane coupling agent are γ-glycidoxypropyltrimethoxysilane, β-(3,4-epoxycyclohexyl)ethyltrimethoxysilane, and the like.

The phenol compound of the formula (II) is used preferably in an amount of 1 to 30 parts by weight, more preferably 6 to 24 parts by weight, the carboxylic anhydride is used preferably in an amount of 1 to 30 parts by weight, more preferably 6 to 24 parts by weight, and the silane coupling agent having the epoxy group is used preferably in an amount of 1 to 30 parts by weight, more preferably 10 to 30 parts by weight, each per 100 parts by weight of polyglycidyl methacrylate.

If desired, the curing composition of the present invention may contain a curing agent other than the above curing agent or system, an additive such as a curing accelerator, and so on.

FIG. 1 shows a cross sectional view of a typical color LCD (STN type) to be used in the present invention.

The LCD of FIG. 1 comprises an upper polarized light film, a glass plate 2, black matrixes 3, a coloring layer 4, an overcoat film 5, upper transparent electrodes 6 (an ITO film), an orientation film 7, a liquid crystal 8, an orientation film 9, an insulation film 10, a lower transparent electrode 11 (an ITO film), a glass substrate 12, a phase difference compensation film 13, a lower polarized light film 14, a diffusion sheet 15, a light-guide plate 16, a reflection sheet 17, and a cold cathode ray tube 18.

In FIG. 1, the color filter comprises the a glass plate 2, the black matrixes 3, the coloring layer 4, the overcoat 5 and the upper transparent electrodes 6.

Figure 2A:
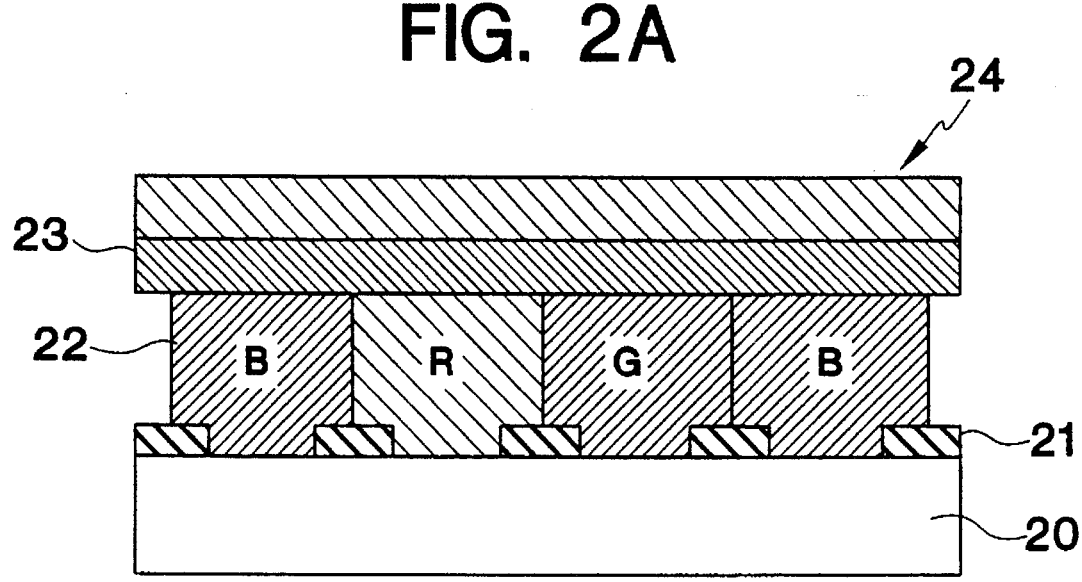
FIG. 2A is a cross sectional view of a color filter for a color liquid crystal display device comprising TFT-addressing elements.
Figure 2B:
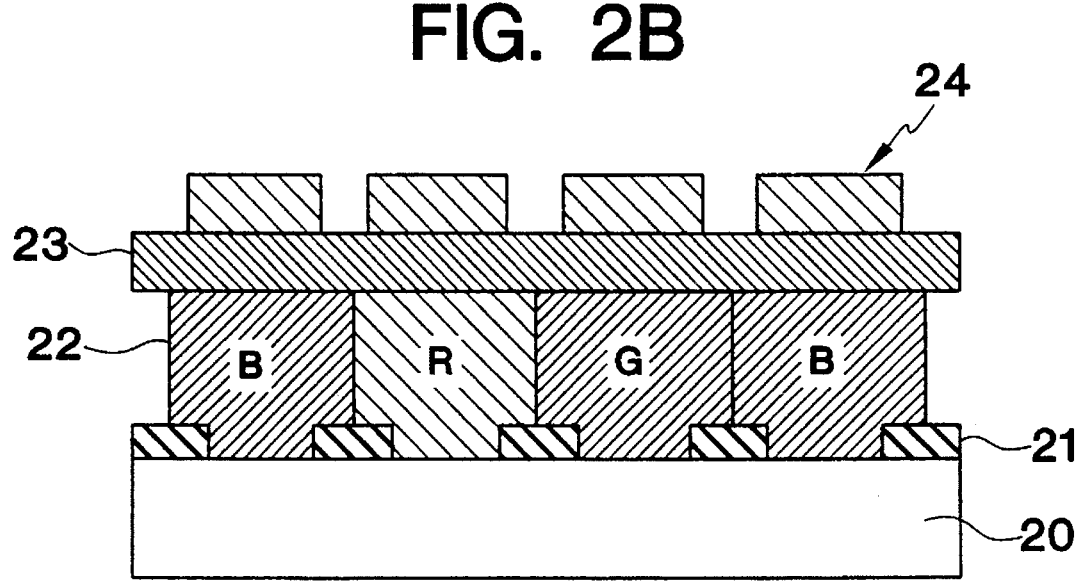
FIG. 2B is a cross sectional view of a color filter for a color liquid crystal display device comprising STN-addressing elements.

Typical examples of the color filter according to the present invention are shown in FIGS. 2A and 2B, which show the cross sectional views of the color filters for the TFT element and the STN element, respectively.

As shown in FIGS. 2A and 2B, the color filter for LCD comprises, in general, a glass substrate 20; coloring layers 22 of red (R), green (G) and blue (B), and black matrixes 21 formed on the glass substrate; a protective film 23 (an overcoat film) which is formed on the coloring layers and the black matrixes; and a transparent electrode or electrodes 24 which is or are formed on the protective film.

The color filter can be produced by any of conventional methods such as a dyeing method, a pigment-dispersing method, an electrodeposition method, a printing method, and so on. Since each method has its advantage and disadvantage, a suitable method is selected according to an object.

Surface flatness required for the color filter is crucial to the color LCD. A degree of surface flatness varies with a kind of LCD. For example, for the active-addressing mode element comprising the TFT, the degree of surface flatness is from 0.1 to 0.2 μm, and for the passive-addressing mode element, in particular, one comprising the STN, the degree of surface flatness is 0.05 μm or less. In general, steps between the red, green and black pixels are filled by the coating of the OC film to achieve the required flatness.

In general, after the formation of the OC film, a transparent electrode such as an ITO film is formed as an electrode for driving the liquid crystal. When the ITO film is formed, it should be formed by sputtering in a high temperature range between 200° C. and 250° C. to achieve a low resistance.

In the color filter for the STN element, since the patterning is necessary after the formation of the ITO film by sputtering, the color filter having the ITO film is subjected to the post-processing such as photolithography, etching, and so on.

The OC film produced from the curable resin composition of the present invention satisfies the requirements for the OC film, such as excellent resistance to heat and high temperature sputtering. In addition, since the curable resin composition of the present invention has good storage stability, it will reduce a production cost of the OC film.

EXAMPLES

The present invention will be illustrated by the following Examples.

Examples 1–8

In ethylcellosolve, polyglycidyl methacrylate having a weight average molecular weight of 139,000 and a curing agent of Table 1 were dissolved in amounts shown in Table 1 (solid content of about 10 wt. %).

The solution was applied on a glass substrate with a spin coater to form a rein film having a dry thickness of 2.0 to 3.0 μm. Then, the resin film on the glass plate was prebaked in a convection oven at 100° C. for 30 minutes and post-baked at 220° C. for 60 minutes.

Then, the baked film was subjected to the following tests to evaluate film properties. The results are shown in Table 1.

(a) Heat resistance

Heat resistance of the film is evaluated by heating the film in a convention oven at 200° C., 220° C., 260° C. or 280° C. for 60 minutes and observing the presence of cracks in the film and further measuring the presence of change of spectroscopic properties.

In Table 1, "○" indicates that no failure was found in the film.

(b) Resistance to high temperature ITO sputtering

Using a sputtering apparatus (SPF-530H manufactured by NICHIDEN ANELBA), an ITO film of about 1500 Å thickness is formed at a substrate temperature of 220° C., and the presence of cracks in the resin film is observed by an optical microscope and further the presence of change of the spectroscopic properties is measured to evaluate the resistance to high temperature sputtering of the resin film.

In Table 1, "○" indicates that no failure was found in the film.

(c) Resistance to ITO patterning

After forming the ITO film under the same condition as in the above test (b), a positive photoresist (Sumiresist PF 7400 manufactured by Sumitomo Chemical Co., Ltd.) is coated over the whole surface of the ITO film with a spin coater and heated at 110° C. for 30 minutes to form a positive photoresist film having a thickness of about 1.5 μm.

On the positive photoresist film, a pattern mask having a striped pattern (line/space=80 μm/20 μm) is placed on the photoresist film with a gap of 50 μm between the mask and the photoresist film, and the photoresist film is exposed at an exposure amount of 100 mJ/cm$^2$ using a proximity exposing apparatus having an ultra-high pressure mercury lamp (MAP-1200 manufactured by Dainippon Screen Co., Ltd.). After exposure, the photoresist film is dipped in a developer (a 0.5 wt. % aqueous solution of sodium hydroxide) at 23° C. for 60 seconds to remove unexposed areas of the photoresist film, whereby the photoresist film is developed, followed by rinsing with water and air blow drying.

Then, areas of the ITO film which are not covered by the positive photoresist film are etched with a mixture of ferric chloride (Baumé degree of 40) and hydrochloric acid (1;1) at 40° C. Thereafter, the etched ITO film having the photoresist film is dipped in a 5 wt. % aqueous solution of sodium hydroxide at 40° C. for 60 seconds to remove the photoresist film, followed by rinsing with water and air blow drying.

The presence of cracks in the ITO film and the OC film were observed. In Table 1, "○" indicates that no failure was found.

TABLE 1

| Ex. No. | Curing agent[1] | Wt. parts of curing agent[2] | (a) Heat resistance (260° C.) | (b) Resistance to sputtering | (c) Resistance to ITO patterning |
|---|---|---|---|---|---|
| 1 | A | 0.05 | ○ | ○ | ○ |
| 2 | A | 0.5 | ○ | ○ | ○ |
| 3 | A | 5 | ○ | ○ | ○ |
| 4 | B | 0.51 | ○ | ○ | ○ |
| 5 | C | 0.05 | ○ | ○ | ○ |
| 6 | D | 0.8 | ○ | ○ | ○ |
| 7 | E | 1 | ○ | ○ | ○ |
| 8 | F | 8.97 | ○ | ○ | ○ |

Notes:
[1] Curing agent:
A. Triphenylphosphine

B. 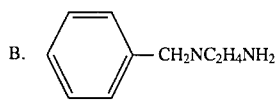

C. 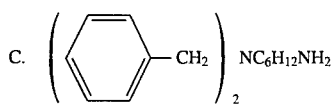

D. 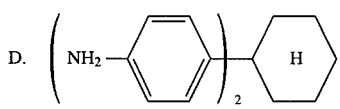

E. 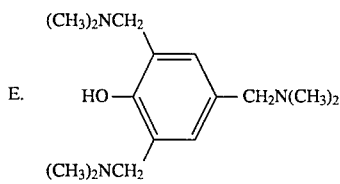

F. 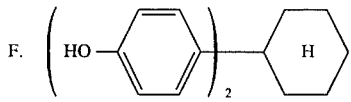

[2] Weight part(s) of the curing agent per 100 parts of the resin

Examples 9–16

In propyleneglycol monomethyl ether acetate, a copolymer of glycidyl methacrylate and methyl methacrylate (molar ratio of 4:6, weight average molecular weight of 120,000) and additives were dissolved in amounts shown in Table 2.

Then, in the same manner as in Example 1 except that the above solution was used, the experiment and evaluation of the properties were carried out. The results are shown in Table 2.

TABLE 2

| Ex. No. | Additive (wt. parts per 100 wt. parts of resin) | | | (a) Heat resistance (260° C.) | (b) Resistance to sputtering | (c) Resistance to ITO patterning |
|---|---|---|---|---|---|---|
| | BPS[1] | Acid anhydride[2] | Silane coupling agent[3] | | | |
| 9 | 6 | X (6) | 20 | ○ | ○ | ○ |
| 10 | 12 | X (12) | 10 | ○ | ○ | ○ |
| 11 | 24 | X (24) | 30 | ○ | ○ | ○ |
| 12 | 12 | Y (12) | 20 | ○ | ○ | ○ |
| 13 | 18 | Y (18) | 20 | ○ | ○ | ○ |
| 14 | 25 | Y (25) | 10 | ○ | ○ | ○ |
| 15 | 24 | X (24) | — | ○ | ○ | ○ |
| 16 | 12 | X (6) Y (6) | 20 | ○ | ○ | ○ |

Notes:
[1] BPS: Bisphenol S
[2] X: Trimellitic anhydride (manufactured by Wako Jun-yaku) Y: 7,7-Dimethyl-norbonyl-2,3-dicarboxylic anhydride (methylhimic acid anhydride) (manufactured by Hitachi Kasei)
[3] Gamma-glycidoxypropyltrimethoxysilane (KBM-403 manufactured by Shin-etsu Chemical Industries, Ltd.)

What we claimed is:

1. A curable resin composition used as an overcoat film of a color filter for a color liquid crystal display device, comprising polyglycidyl methacrylate, a curing system which comprises a carboxylic anhydride and a phenol compound of the formula:

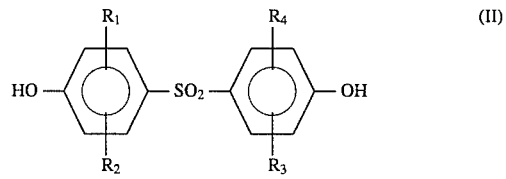

(II)

wherein $R_1$ to $R_4$ are independently a hydrogen atom, a halogen atom, an alkyl group or a halogen-substituted alkyl group, and a silane coupling agent having an epoxy group.

2. The curable resin composition according to claim 1, wherein said polyglycidyl methacrylate comprises not more than 60% by weight of glycidyl methacrylate monomer units, and a content of said phenol compound of the formula (II) is from 1 to 30 parts by weight, a content of said carboxylic anhydride is from 1 to 30 parts by weight, and a content of said silane coupling agent having the epoxy group is from 1 to 30 parts by weight, each per 100 parts by weight of polyglycidyl methacrylate.

3. The curable resin composition according to claim 1, wherein the phenol compound has the following formula (a):

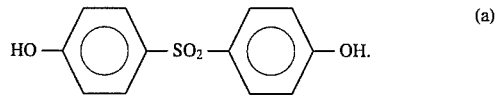

(a)

4. The curable resin composition according to claim 1, wherein the phenol compound has the following formula (b):

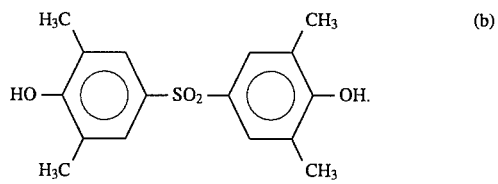

(b)

5. The curable resin composition according to claim 1, wherein the phenol compound has the following formula (c):

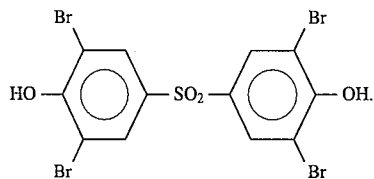

6. The curable resin composition according to claim 1, wherein said carboxylic anhydride is selected from the group consisting of trialkyltetrahydrophthalic anhydride, methylcyclohexenedicarboxylic anhydride, phthalic anhydride, trimellitic anhydride, polymellitic anhydride, benzophenonetetracarboxylic anhydride, ethyleneglycol bistrimellitate, glycerol tristrimellitate, chlorendic anhydride, tetrabromophthalic anhydride, and acid anhydrides of the formula:

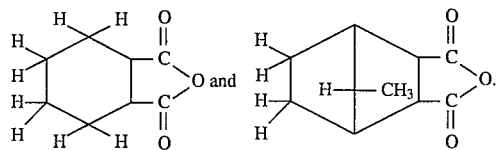

7. The curable resin composition according to claim 1, wherein said silane coupling agent is γ-glycidoxypropyltrimethoxysilane.

8. The curable resin composition according to claim 1, wherein said silane coupling agent is β-(3,4-epoxycyclohexyl) ethyltrimethoxysilane.

9. The curable resin composition according to claim 2, wherein, the content of said phenol compound of the formula (II) is from 6 to 24 parts by weight, the content of said carboxylic anhydride is from 6 to 24 parts by weight, and the content of said silane coupling agent having the epoxy group is from 10 to 30 parts by weight.

10. The curable resin composition according to claim 1, wherein the substituent is a halogen atom.

* * * * *